United States Patent
Lee et al.

(10) Patent No.: US 9,445,372 B1
(45) Date of Patent: Sep. 13, 2016

(54) POWER MANAGEMENT METHODS AND SYSTEMS FOR A MOBILE DEVICE

(71) Applicant: Verizon Patent and Licensing Inc., Arlington, VA (US)

(72) Inventors: Woo Beum Lee, Basking Ridge, NJ (US); Jeffrey M. Walsh, Basking Ridge, NJ (US); Michelle Felt, Warren, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/703,218

(22) Filed: May 4, 2015

(51) Int. Cl.
*H04M 3/00* (2006.01)
*H04W 52/02* (2009.01)
*H04W 88/02* (2009.01)

(52) U.S. Cl.
CPC ....... *H04W 52/028* (2013.01); *H04W 52/0238* (2013.01); *H04W 52/0245* (2013.01); *H04W 52/0248* (2013.01); *H04W 52/0258* (2013.01); *H04W 88/02* (2013.01)

(58) Field of Classification Search
CPC ......... H04W 52/028; H04W 52/0238; H04W 52/0248; H04W 52/0258; H04W 52/0245; H04W 88/02
USPC ............ 455/404.1, 412.1–414.2, 418–422.1, 455/456.1, 456.2, 456.6, 67.11, 573, 574, 455/572, 570
See application file for complete search history.

(56) References Cited

U.S. PATENT DOCUMENTS

| 5,937,061 A | * | 8/1999 | Kim ...................... H04M 9/003 379/157 |
| 8,655,307 B1 | * | 2/2014 | Walker .............. H04W 52/0212 455/343.5 |

* cited by examiner

*Primary Examiner* — Babar Sarwar

(57) ABSTRACT

An exemplary power management system detects a signal level representative of an environmental condition external to a mobile device, determines that the signal level is within a predetermined range, and disables, in response to the determination that the signal level is within the predetermined range, a feature of the mobile device. Corresponding systems and methods are also described.

20 Claims, 7 Drawing Sheets

POWER MANAGEMENT METHODS AND SYSTEMS FOR A MOBILE DEVICE

BACKGROUND INFORMATION

Smartphones and other types of mobile devices are constantly using battery power when they are not plugged in and recharging. For example, a mobile device may use battery power when the mobile device attempts to connect to a mobile network, when the mobile device generates sound in response to user interaction with the mobile device and/or in response to receiving a telephone call, when the mobile device executes applications, when the mobile device displays content on a display screen, and when the mobile device performs a variety of other functions.

Unfortunately, all of these functions can deplete a mobile device's battery power relatively quickly. Hence, it is not uncommon for a user to have to recharge his or her mobile device multiple times a day in order to be able to use the mobile device throughout the day. This can be inconvenient or even impossible for the user to perform. For example, if the user is traveling or does not have access to a power cord for the mobile device, the battery power of the mobile device may deplete to a level that renders the mobile device inoperable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Power management methods and systems for a mobile device are described herein. As will be described below, a power management system may detect a signal level representative of an environmental condition external to a mobile device, determine that the signal level is within a predetermined range, and, in response, disable a feature of the mobile device.

For example, the power management system may use a microphone that is a part of the mobile device to detect an ambient noise level of ambient noise surrounding the mobile device. If the power management system determines that the ambient noise level is above a predetermined threshold, the power management system may determine that a user of the mobile device is in a noisy environment (e.g., at a loud concert, in a loud club, etc.) and therefore cannot hear sounds emitted from the mobile device. Hence, in response to determining that the ambient noise level is above the predetermined threshold, the power management system may automatically disable a sound feature (e.g., a ringer and/or one or more system sounds) of the mobile device. This may conserve battery power that would be used by the mobile device to generate and emit sounds in the noisy environment if the sound feature were not disabled.

As another example, the power management system may detect a mobile network signal strength level representative of a strength of a mobile network (i.e., a strength of a mobile network signal) at a location of the mobile device. If the power management system determines that the mobile network signal strength level is below a predetermined threshold (which may occur, for example, if the mobile device is located in an area where there is no mobile network coverage), the power management system may direct the mobile device to abstain from attempting to connect to the mobile network. In this manner, battery power that would otherwise be used by the mobile device while attempting to connect to the mobile network may be conserved.

The methods and systems described herein may improve the functioning of a mobile device in a number of different ways. For example, the methods and systems described herein may enable a mobile device to adapt to ever-changing environmental conditions external to the mobile device in order to conserve battery life of the mobile device. Moreover, the methods and systems described herein may enable the mobile device to preemptively perform power saving operations in order to ensure that the mobile device has a user-specified amount of battery power remaining at a particular time of day (e.g., when the user is on his way home from work at the end of a day). Other benefits of the methods and systems described herein will be made apparent herein.

Figure 1:
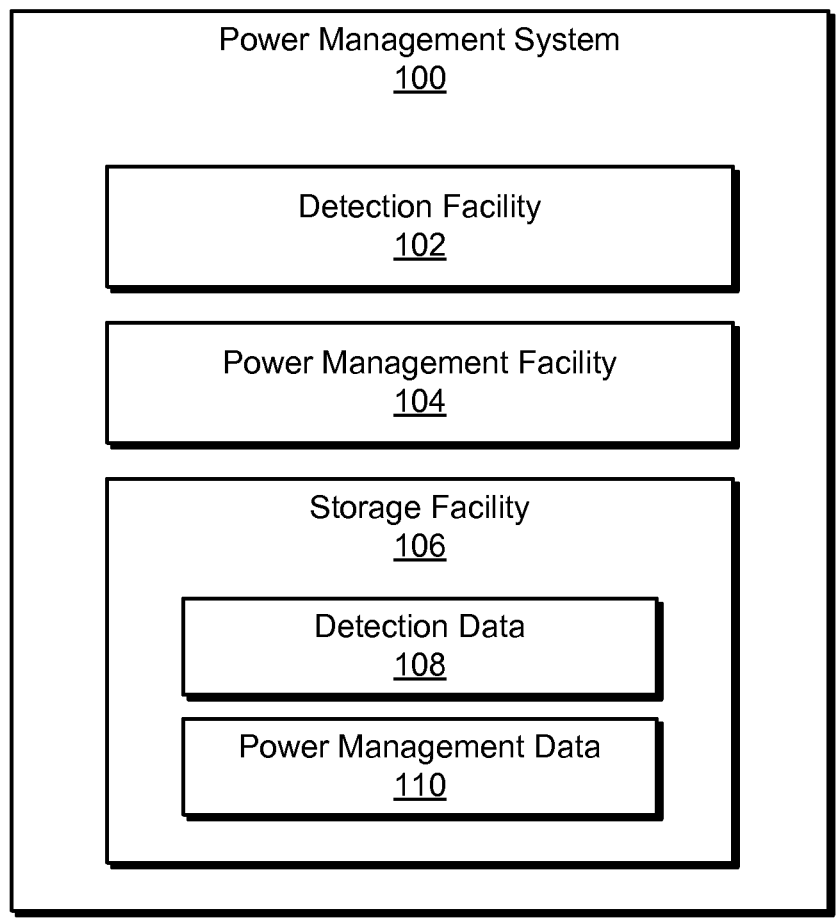
FIG. 1 illustrates an exemplary power management system according to principles described herein.

FIG. 1 illustrates an exemplary power management system 100 ("system 100") configured to manage an amount of battery power utilized by a mobile device. As shown, system 100 may include, without limitation, a detection facility 102, a power management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store detection data 108 generated and/or used by detection facility 102 and power management data 110 generated and/or used by power management facility 104. Storage facility 106 may store additional or alternative data as may serve a particular implementation. Data stored by storage facility 106 may be accessed by system 100 from any suitable source, including a source internal or external to system 100.

Detection facility 102 may detect a signal level representative of an environmental condition external to a mobile device. The signal level may include an ambient noise level of ambient noise surrounding the mobile device and/or a mobile network signal strength level representative of a strength of a mobile network at a location of the mobile device. In some examples, the signal level may additionally or alternatively include signal levels representative of other types of environmental conditions. For example, the signal level may include a signal level representative of a strength of a wireless local area network ("LAN") signal. In some examples, the signal level is not associated with a location-based service (e.g., the signal level may not be representative of global positioning service ("GPS") coordinates).

Detection facility 102 may detect the signal level representative of the environmental condition external to the mobile device in any suitable manner. For example, detection facility 102 may utilize a microphone that is a part of the mobile device to detect an ambient noise level associated with the mobile device. As another example, detection facility 102 may utilize an antenna and one or more signal processing components included in the mobile device to detect a mobile network signal strength level.

In some examples, detection facility 102 may utilize one or more components that are not a part of the mobile device to detect the signal level representative of the environmental condition external to the mobile device. For example, detection facility 102 may detect the ambient noise level by utilizing a microphone that is a part of a wireless (e.g., BLUETOOTH) headset that is communicatively coupled to the mobile device.

Power management facility 104 may perform various power management operations with respect to a mobile device. For example, in response to detection facility 102 detecting a signal level representative of an environmental condition external to a mobile device, power management facility 104 may determine that the signal level is within a predetermined range. In response to this determination, power management facility 104 may disable a feature of the mobile device in order to conserve battery power utilized by the mobile device. Various examples of this will be described in more detail below.

Figure 2:
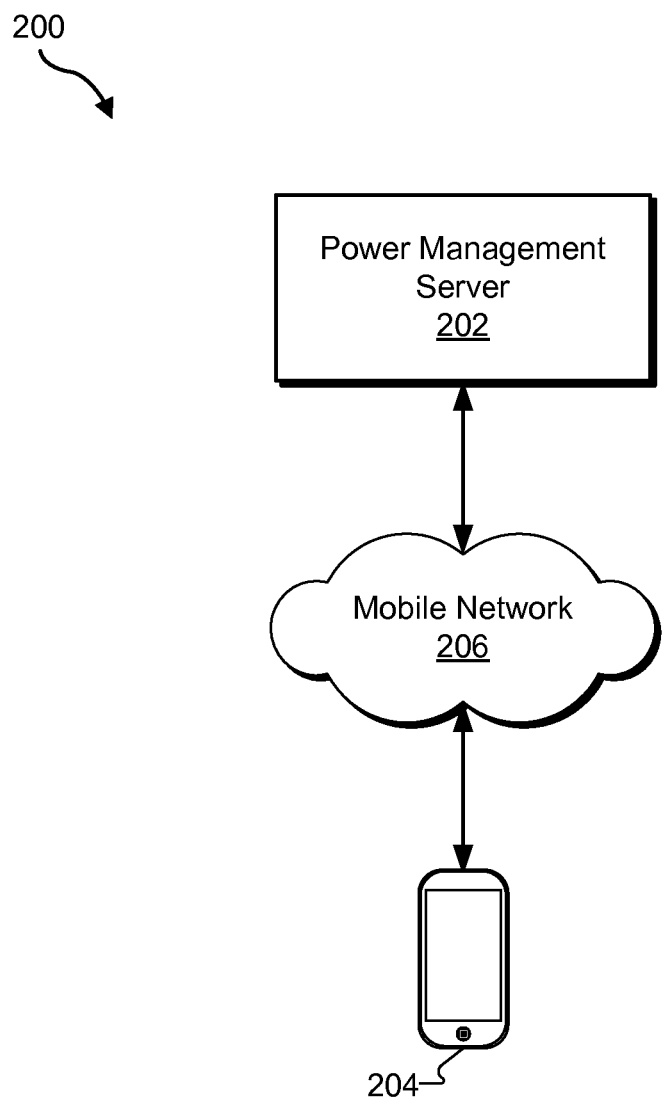
FIG. 2 shows an exemplary implementation of the system of FIG. 1 according to principles described herein.

FIG. 2 shows an exemplary implementation 200 of system 100. As shown, implementation 200 may include a power management server 202 in communication with a mobile device 204 by way of a mobile network 206. In implementation 200, one or more of facilities 102-106 of system 100 may be implemented entirely by power management server 202, entirely by mobile device 204, or distributed across power management server 202 and mobile device 204 in any manner.

Mobile network 206 may include a wireless network provided and/or managed by a mobile carrier. For example, mobile network 206 may include a 4G LTE network, a 3G network, a 2G network, and/or any other type of data and/or voice network that may be utilized by mobile device 204.

Power management server 202 and mobile device 204 may communicate by way of mobile network 206 (and/or any other type of network) using any communication platforms and technologies suitable for transporting data and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Real-Time Transport Protocol ("RTP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Power management server 202 may be implemented by one or more computing devices located remotely from mobile device 204. Power management server 202 may be associated with (e.g., maintained and/or managed by) a provider of mobile device services (e.g., a mobile carrier). Power management server 202 may alternatively be associated with any other entity as may serve a particular implementation.

In some examples, power management server 202 may provide a power management mobile application that may be executed by mobile device 204. The power management mobile application may be used by a user of the mobile device 204 to customize the power saving operations performed by system 100. An exemplary power management mobile application will be described below.

Mobile device 204 may include any mobile computing device associated with (e.g., utilized by) a user. For example, mobile device 204 may include a mobile telephone (e.g., a smartphone), a tablet computer, a laptop computer, and/or any other mobile computing device as may serve a particular implementation.

Various manners in which system 100 may determine that a signal level is within a predetermined range and, in response, disable a feature of the mobile device in order to conserve battery power utilized by the mobile device will now be described.

In some examples, the signal level detected by system 100 includes an ambient noise level representative of ambient noise surrounding the mobile device. In these examples, system 100 may determine that the ambient noise level is within the predetermined range by determining that the ambient noise level is above a predetermined threshold. The predetermined threshold may be any suitable value. For example, the predetermined threshold may be a sound level that is high enough that it would be difficult or impossible for the user to hear sound emitted by the mobile device in the presence of the ambient noise. To illustrate, if the mobile device is capable of emitting sound having a maximum loudness level of 65 decibels, the predetermined threshold may be set to be a value equal to or greater than 65 decibels. In some examples, the predetermined threshold may be set by the user of the mobile device (e.g., within a power management mobile application executed by the mobile device).

In response to determining that the ambient noise level is above the predetermined threshold, system 100 may disable a sound feature of the mobile device. For example, system 100 may disable one or more system sounds of the mobile device (e.g., sounds that are emitted by the mobile device in response to user interaction with the mobile device).

Additionally or alternatively, if the mobile device is configured to receive telephone calls, messages (e.g., short message service ("SMS") messages, emails, etc.), and/or other incoming communications by way of a mobile network, system 100 may prevent the mobile device from emitting one or more audible notifications representative of one or more these communications in response to determining that the ambient noise level is above the predetermined threshold.

For example, in response to determining that the ambient noise level is above the predetermined threshold, system 100 may disable a ringer of the mobile device. This may prevent the mobile device from playing the ringer when the mobile device receives a telephone call, thereby conserving battery power associated with generating sound representative of the ringer.

In addition to disabling an audible notification representative of an incoming communication (e.g., an incoming telephone call), system 100 may enable a vibration mode of the mobile device in which the mobile device vibrates in response to receiving the incoming communication. In this manner, the user may still be aware of the incoming communication even if the user is in a relatively noisy environment.

In cases where the incoming communication is a telephone call, it may be difficult or even impossible for the user to answer the telephone call due to the relatively noisy environment. Hence, in some examples, system 100 may, in response to determining that the ambient noise level is above the predetermined threshold, enable an auto-response mode of the mobile device. If the mobile device receives the telephone call while in the auto-response mode, the mobile device may automatically transmit a message (e.g., a text message) to a mobile telephone that placed the telephone call. The message may be user-customizable and, for example, may indicate that the user of the mobile device is unavailable to receive the telephone call.

In some examples, system 100 may maintain a list of contacts associated with the auto-response mode. The list of contacts may be created by the user and may include people to whom the user would like to transmit a message if he or she is unavailable to take a telephone call due to a relatively noisy environment. When system 100 detects an incoming telephone call from a mobile telephone, system 100 may determine whether a person associated with the mobile telephone is included in the list of contacts. If the person associated with the mobile telephone is in the list of contacts, system 100 may direct the mobile device to transmit a message to the mobile telephone indicating that the user of the mobile device is unavailable to receive the telephone call. However, if the person associated with the mobile telephone is not in the list of contacts, system 100 may direct the mobile device to abstain from transmitting a message to the mobile telephone in response to the mobile device receiving the telephone call from the mobile telephone.

In some examples, in response to determining that the ambient noise level is above the predetermined threshold, system 100 may direct the mobile device to abstain from attempting to connect to a mobile network (e.g., by disabling a transceiver feature of the mobile device so that the mobile device cannot connect to a cell tower associated with the mobile network). This power saving option may be selected by the user if, for example, the user thinks that he or she will not be interested in receiving content by way of the mobile network while in a relatively noisy environment (e.g., if the user knows that he or she will not be using the mobile device while in the noisy environment).

In some examples, the signal level detected by system 100 includes a mobile network signal strength level representative of a strength of a mobile network at a location of the mobile device. In these examples, system 100 may determine that the mobile network signal strength level is within the predetermined range by determining that the mobile network signal strength level is below a predetermined threshold. The predetermined threshold may be any suitable value. For example, the predetermined threshold may be a signal strength level that results in the mobile device not being able to maintain a constant connection to the mobile network for more than a predetermined amount of time (e.g., a few seconds).

In some examples, if the mobile device is at a particular location where the strength of the mobile network is relatively weak (e.g., if the mobile device is in a remote area where there is no mobile network signal), the mobile device may repeatedly and unsuccessfully attempt to connect to the mobile network. These repeated attempts may drain the battery power of the mobile device relatively quickly. Hence, upon determining that the mobile network signal strength level is below the predetermined threshold, system 100 may direct the mobile device to enter a "sleep" mode (e.g., an "airplane" mode, a "radio-silent" mode, etc.) in which the mobile device abstains from attempting to connect to the mobile network, thereby conserving battery power that would otherwise be consumed by the mobile device attempting to connect to the mobile network.

In some examples, system 100 may direct the mobile device to periodically "wake up" (i.e., exit the sleep mode and again attempt to connect to the mobile network). If the mobile device is successful in connecting to the mobile network, the mobile device may fetch data from one or more network servers (e.g., data representative of email and/or SMS message content) and then re-enter the sleep mode in order to conserve battery power while the mobile network signal strength level is below the predetermined threshold.

To this end, system 100 may maintain data representative of a setting that specifies a time interval that the mobile device is to abstain from attempting to connect to the mobile network. The time interval may be user-specified, dependent on the mobile network signal strength level (e.g., the lower the mobile network signal strength level as last detected by system 100, the longer the time interval), or otherwise specified as may serve a particular implementation.

System 100 may detect an elapsing of the time interval and, in response, direct the mobile device to attempt to connect to the mobile network and fetch data from a network server while the mobile network signal strength level is below the predetermined threshold. In response to a completion of the attempt to connect to the mobile network and fetch data from the network server, system 100 may direct the mobile device to re-enter the sleep mode and abstain from attempting to connect to the mobile network. This process may be repeated until system 100 detects that the mobile network signal strength level has increased to a level above the predetermined threshold.

Additionally or alternatively, system 100 may, in response to determining that that the mobile network signal strength level is below the predetermined threshold, disable one or more applications being executed by the mobile device. For example, system 100 may disable (e.g., close or otherwise stop) an application that relies on a network connection (e.g., an application that requires location services, a streaming media service application, and/or an application that relies on access to the Internet).

In some examples, the signal level detected by system 100 includes a wireless local area network signal strength level (e.g., a Wi-Fi signal strength level) representative of a strength of a wireless local area network (e.g., a Wi-Fi network) at a location of the mobile device. In these examples, system 100 may determine that the wireless local area network signal strength level is within the predetermined range by determining that the wireless local area network signal strength level is below a predetermined threshold. The predetermined threshold may be any suitable value. For example, the predetermined threshold may be a signal strength level that results in the mobile device not being able to maintain a constant connection to the wireless local area network for more than a predetermined amount of time (e.g., a few seconds).

Similar to that described above in connection with the mobile network, if the mobile device is at a particular location where the strength of the wireless local area network is relatively weak (e.g., if the mobile device is relatively far away from a Wi-Fi router), the mobile device may repeatedly and unsuccessfully attempt to connect to the wireless local area network. These repeated attempts may drain the battery power of the mobile device relatively quickly. Hence, upon determining that the wireless local area network signal strength level is below the predetermined threshold, system 100 may direct the mobile device to abstain from attempting to connect to the wireless local area network (e.g., by directing the mobile device to disable a Wi-Fi feature of the mobile device), thereby conserving battery power that would otherwise be consumed by the mobile device attempting to connect to the wireless local area network.

Subsequent to disabling a feature of the mobile device in response to determining that a detected signal level is within a predetermined range, system 100 may continue to monitor (e.g., periodically) the signal level. If the signal level changes to being outside the predetermined range, system 100 may re-enable the feature of the mobile device. For example, as described above, system 100 may disable a sound feature of the mobile device in response to determining that an ambient noise level is above a predetermined threshold. When the ambient noise level subsides and goes below the predetermined threshold, system 100 may automatically re-enable the sound feature of the mobile device.

Figure 3:
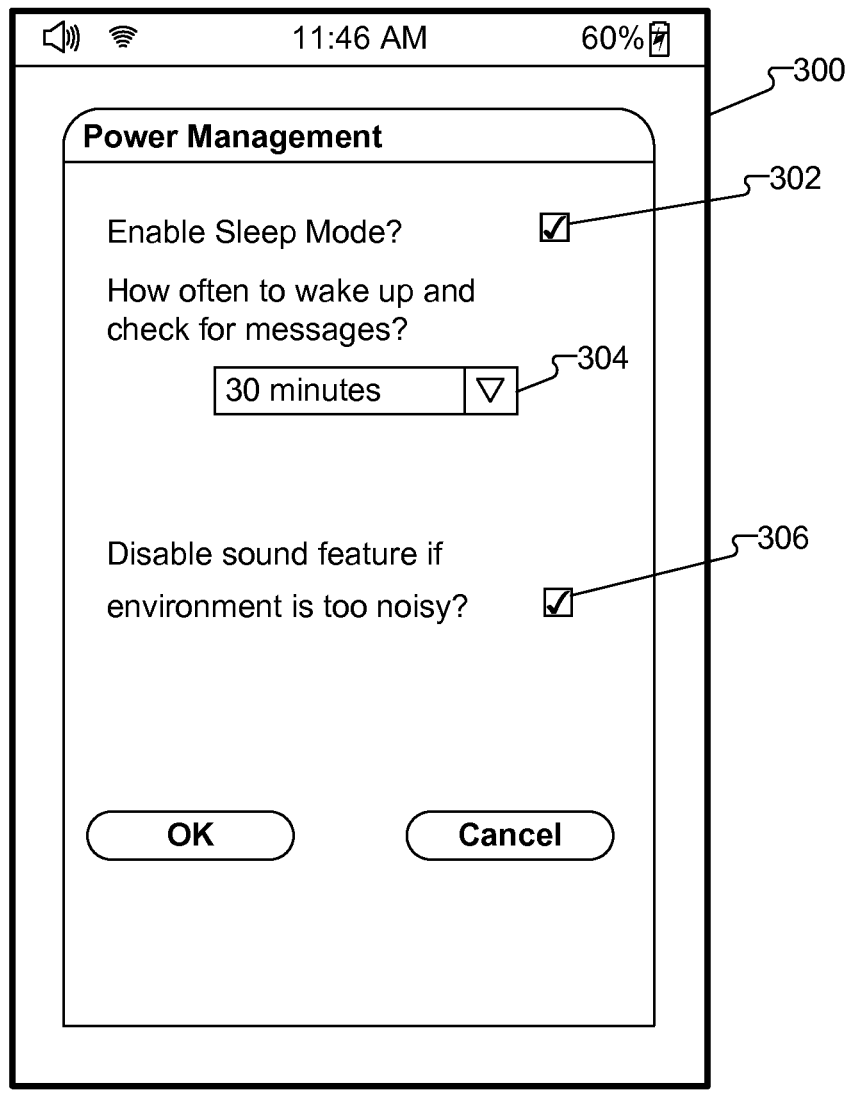
FIGS. 3-4 show exemplary user interfaces according to principles described herein.

In some examples, system 100 may provide a power management mobile application that may be executed by mobile device 204. A user may interact with the power management mobile application in order to configure one or more power saving operations that may be performed by system 100. For example, FIG. 3 shows an exemplary user interface 300 associated with a power management mobile application and that may be presented by system 100 by way of the mobile device. As shown, a user may select option 302 to enable a sleep mode if a mobile network signal strength level goes below a predetermined level and specify how often the mobile device is to wake up and attempt to connect to the mobile network by selecting an amount of time from drop down menu 304. FIG. 3 also shows that the user may select an option 306 to disable a sound feature of the mobile device if an ambient noise level is above a predetermined threshold level. It will be recognized that user interface 300 is merely exemplary of the many different user interfaces that may be provided in association with the methods and systems described herein.

In some examples, system 100 may receive user input representative of a request for a mobile device to have at least a user-specified amount of battery power remaining at a particular time of day (e.g., so that the user knows that he or she will be able to use the mobile device at the particular time of day). In response, system 100 may identify one or more power saving operations configured to ensure that the mobile device has at least the user-specified amount of battery power remaining at the particular time of day. System 100 may then perform the one or more power saving operations while the mobile device is utilizing battery power prior to the particular time of day.

Figure 4:
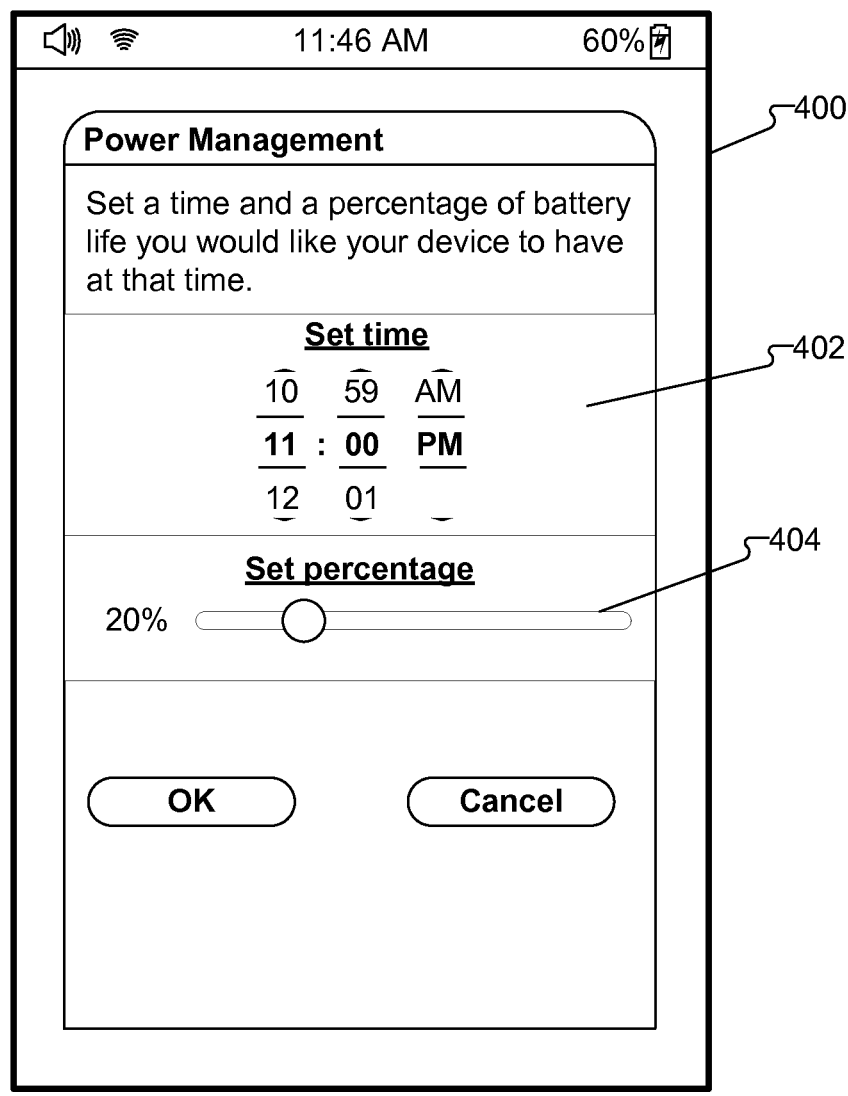

To illustrate, FIG. 4 shows an exemplary user interface 400 that may be presented by system 100 (e.g., by way of a mobile device). As shown, the user may interact with a field 402 to specify a time of day and with slider bar 404 to specify an amount of battery power that the mobile device is to have at the specified time of day. In the particular example, of FIG. 4, the user has specified that the mobile device is to have twenty percent battery life at 11:00 PM. Based on these settings, system 100 may identify one or more power saving operations (e.g., one or more of the power saving operations described above) configured to ensure that the mobile device has twenty percent battery life at 11:00 PM.

System 100 may identify the one or more power saving operations that will ensure that the mobile device has the requested battery life at the requested time in any suitable manner. For example, the one or more power saving operations may be identified based on a total amount of time that the mobile device is expected to be unplugged and operating on battery power until the requested time. To illustrate, if the user unplugs the mobile device from being charged at 7:00 AM, and if the requested time is 11:00 PM, system 100 may identify power saving operations based on an assumption that the mobile device will be operating on battery power for sixteen consecutive hours.

The identification and performance of the one or more power saving operations may additionally or alternatively be based on a usage profile associated with the mobile device. As used herein, a "usage profile" may include data that indicates a pattern of usage of the mobile device over time. For example, the usage profile may indicate that a user of the mobile device typically checks email at a certain time each day, that the user typically uses a particular application on the mobile device at a certain time each day, that the user typically uses the mobile device for telephone calls for a certain number of minutes each day, and/or one or more other patterns of usage as may serve a particular implementation.

System 100 may maintain data representative of the usage profile in any suitable manner. For example, system 100 may maintain data representative of one or more telephone call logs, email access logs, etc. Based on the usage profile, system 100 may identify one or more power saving operations that will ensure that the mobile device has the requested battery life at the requested time.

To illustrate, a user of a mobile device may interact with user interface 400 to provide user input representative of a request for the mobile device to have at least twenty-five percent battery power remaining at 7:00 PM so that the user can utilize the mobile device on his train ride home from work each day without worrying that the mobile device will run out of battery power. In response to the user input, system 100 may analyze a usage profile associated with the mobile device and determine that the user typically uses the mobile device to check email, access the Internet, and interact with other network-based applications between 7:30 AM and 8:30 AM, which corresponds to when the user takes the train to work in the morning, and between 12:00 PM and 1:00 PM, which corresponds to when the user takes a lunch break. However, the user typically does not use the mobile device between 8:30 AM and 12:00 PM and between 1:00 PM and 6:30 PM, which correspond to when the user is busy at work. Based on this usage profile, system 100 may prevent the mobile device from connecting to a mobile network, disable one or more sound features of the mobile device, and/or perform one or more other power saving operations (e.g., any of the power saving operations described above) between 8:30 AM and 12:00 PM and between 1:00 PM and 6:30 PM in order to conserve battery power for when the user will want to again use the mobile device (i.e., at 7:00 PM).

Figure 5:
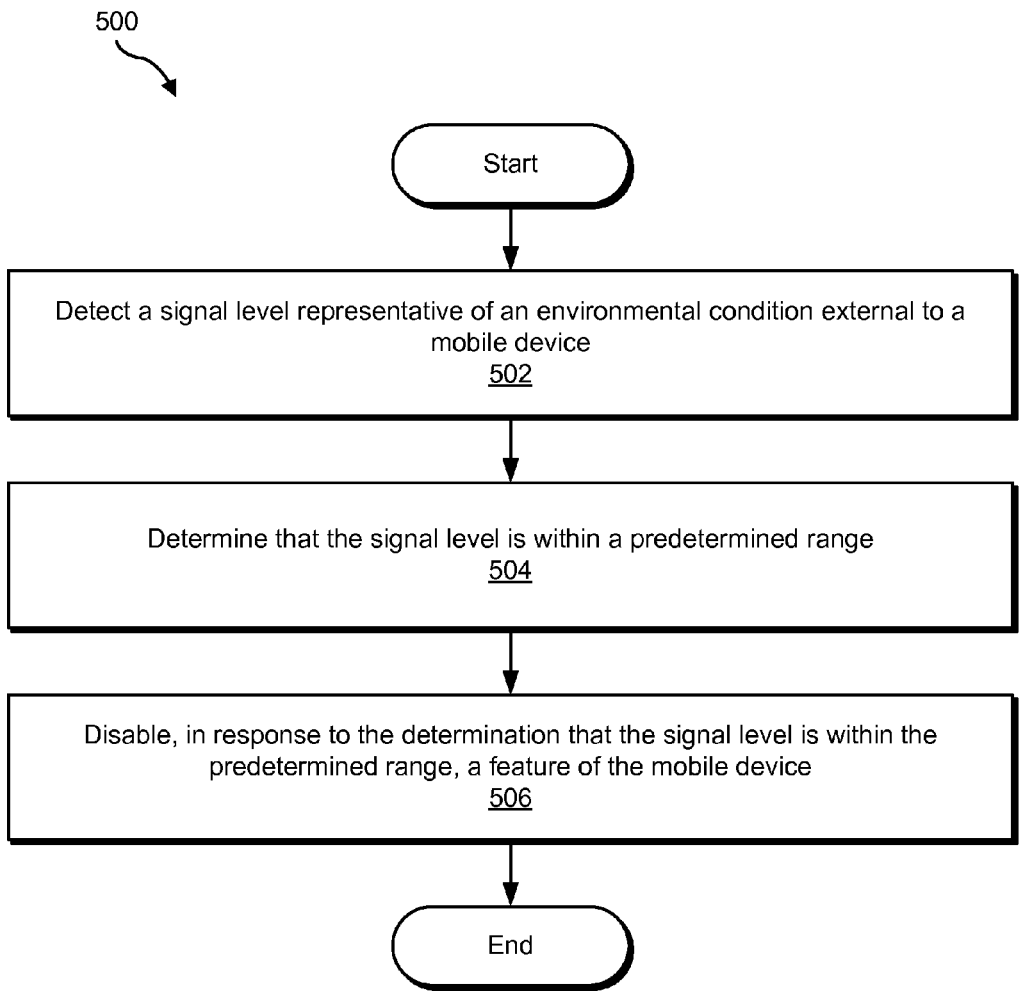
FIGS. 5-6 illustrate exemplary power management methods according to principles described herein.

FIG. 5 illustrates an exemplary power management method 500. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, a power management system detects a signal level representative of an environmental condition external to a mobile device. Step 502 may be performed in any of the ways described herein.

In step 504, the power management system determines that the signal level is within a predetermined range. Step 504 may be performed in any of the ways described herein.

In step 506, the power management system disables, in response to the determination that the signal level is within the predetermined range, a feature of the mobile device. Step 506 may be performed in any of the ways described herein.

Figure 6:
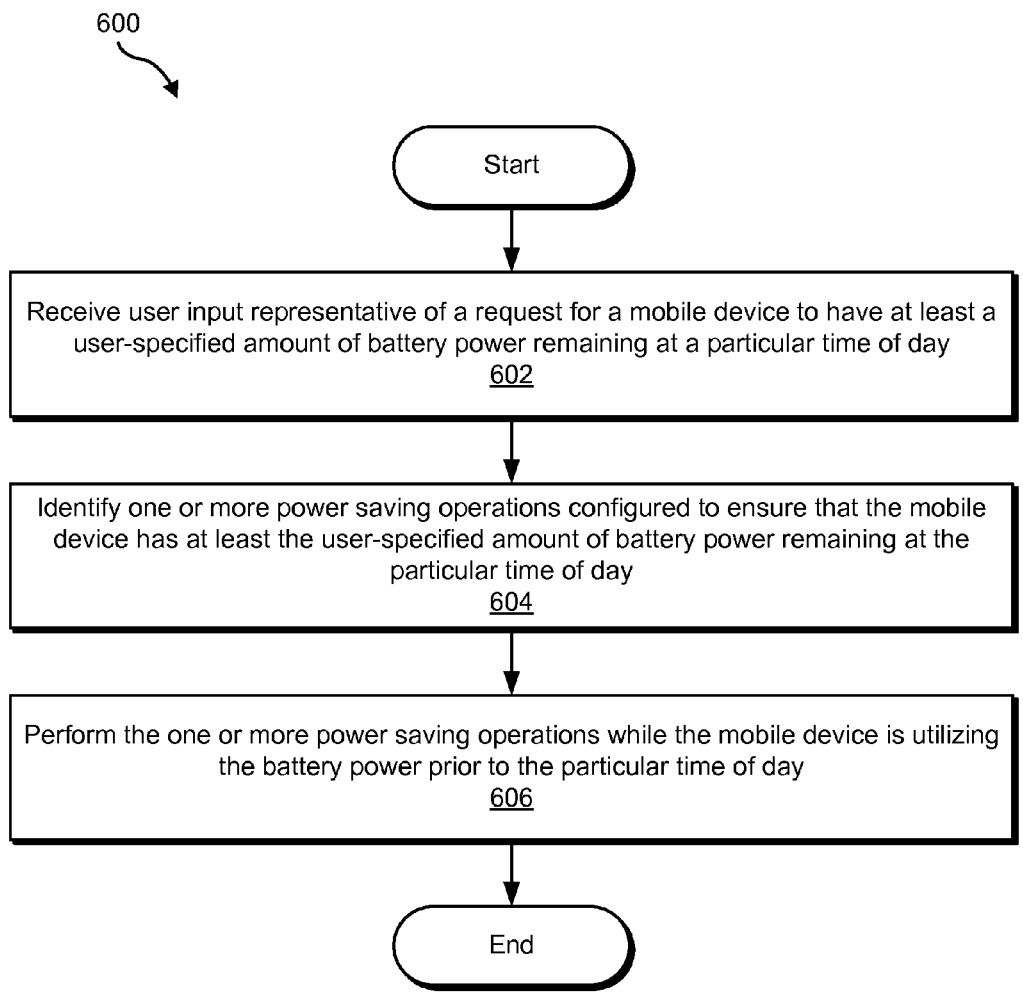

FIG. 6 illustrates another exemplary power management method 600. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a power management system receives user input representative of a request for a mobile device to have at least a user-specified amount of battery power remaining at a particular time of day. Step 602 may be performed in any of the ways described herein.

In step 604, the power management system identifies one or more power saving operations configured to ensure that the mobile device has at least the user-specified amount of battery power remaining at the particular time of day. Step 604 may be performed in any of the ways described herein.

In step 606, the power management system performs the one or more power saving operations while the mobile device is utilizing the battery power prior to the particular time of day. Step 606 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), erasable programmable read-only memory ("EPROM"), electrically erasable programmable read-only memory ("EEPROM"), a Flash EEPROM device, any other memory chip or cartridge, or any other tangible medium from which a computer can read.

Figure 7:
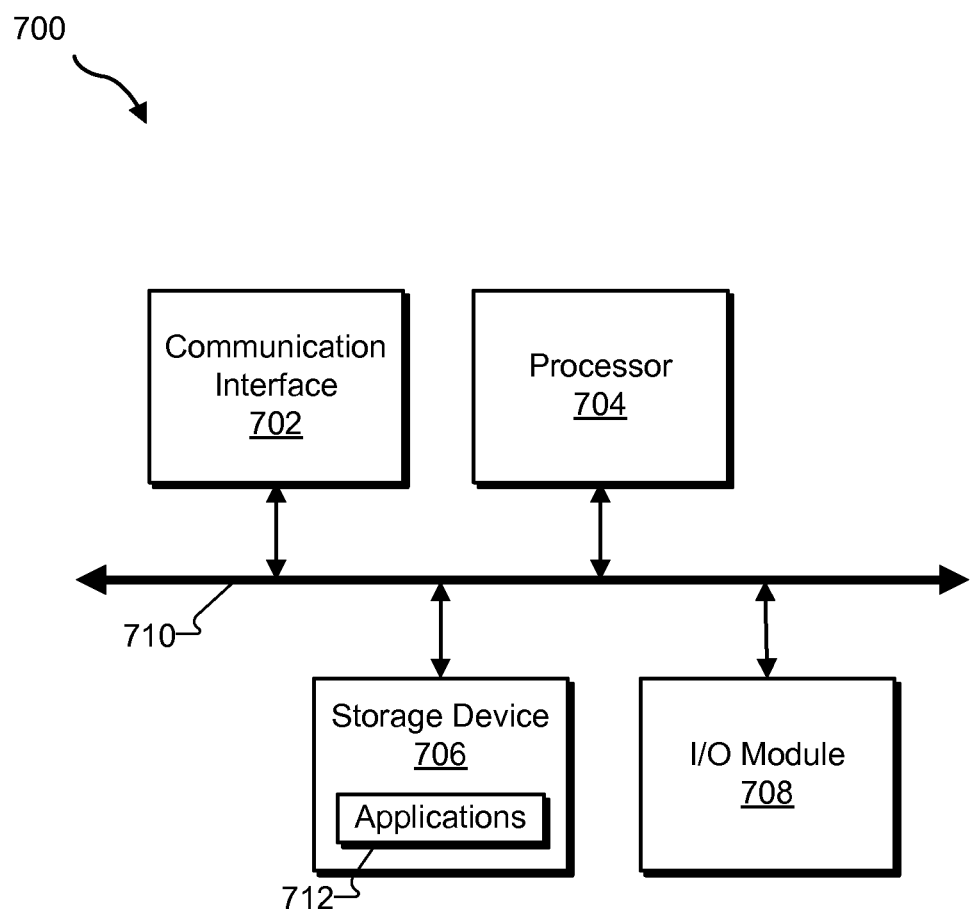
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with detection facility 102 and power management facility 104. Likewise, storage facility 106 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a power management system, a signal level representative of an environmental condition external to a mobile device;
   determining, by the power management system, that the signal level is within a predetermined range;
   disabling, by the power management system in response to the determining that the signal level is within the predetermined range, a feature of the mobile device, the disabling comprising directing, in response to the determining that the signal level is within the predetermined range, the mobile device to abstain from attempting to connect to a mobile network;
   maintaining, by the power management system, data representative of a setting that specifies a time interval that the mobile device is to abstain from connecting to the mobile network;
   detecting, by the power management system, an elapsing of the time interval;
   directing, by the power management system in response to the detecting of the elapsing of the time interval, the mobile device to attempt to connect to the mobile network and fetch data from a network server while the signal level is within the predetermined range; and
   directing, by the power management system in response to a completion of the attempt to connect to the mobile network and fetch data from the network server, the mobile device to again abstain from attempting to connect to the mobile network.

2. The method of claim 1, wherein the signal level is an ambient noise level, and wherein the detecting of the signal level comprises utilizing a microphone that is a part of the mobile device to detect the ambient noise level.

3. The method of claim 2, wherein the determining that the signal level is within the predetermined range comprises determining that the ambient noise level is above a predetermined threshold.

4. The method of claim 3, wherein the disabling of the feature of the mobile device further comprises disabling, in response to the determining that the ambient noise level is above the predetermined threshold, a sound feature of the mobile device.

5. The method of claim 4, further comprising enabling, in response to the determining that the ambient noise level is above the predetermined threshold, an auto-response mode of the mobile device in which the mobile device automatically transmits a message to a mobile telephone that places a telephone call to the mobile device while the ambient noise level is above the predetermined threshold, the message indicating that a user of the mobile device is unavailable to receive the telephone call.

6. The method of claim 4, further comprising:
   maintaining, by the power management system, a list of contacts associated an auto-response mode of the mobile device;
   detecting, by the power management system while the ambient noise level is above the predetermined threshold, an incoming telephone call from a mobile telephone to the mobile device;
   determining, by the power management system, that the mobile telephone is associated with a person included in the list of contacts associated with the auto-response mode of the mobile device; and
   directing, by the power management system in response to the determining that the mobile telephone is associated with the person included in the list of contacts, the mobile device to transmit a message to the mobile telephone, the message indicating that a user of the mobile device is unavailable to receive the telephone call.

7. The method of claim 1, wherein:
   the signal level is a mobile network signal strength level representative of a strength of a mobile network at a location of the mobile device; and
   the determining that the signal level is within the predetermined range comprises determining that the mobile network signal strength level is below a predetermined threshold.

8. The method of claim 7, wherein the disabling of the feature of the mobile device further comprises disabling, in response to the determining that the mobile network signal strength level is below the predetermined threshold, an application being executed by the mobile device.

9. The method of claim 7, wherein the time interval that the mobile device is to abstain from attempting to connect to the mobile network is dependent on the detected mobile network signal strength level.

10. The method of claim 1, further comprising:
receiving, by the power management system, user input representative of a request for the mobile device to have at least a user-specified amount of battery power remaining at a particular time of day;
wherein the detecting of the signal level is performed in response to the receiving of the user input.

11. The method of claim 1, embodied as computer-executable instructions on at least one non-transitory computer-readable medium.

12. A method comprising:
receiving, by a power management system, user input representative of a request for a mobile device to have at least a user-specified amount of battery power remaining at a particular time of day;
identifying, by the power management system, one or more power saving operations configured to ensure that the mobile device has at least the user-specified amount of battery power remaining at the particular time of day; and
performing, by the power management system, the one or more power saving operations while the mobile device is utilizing the battery power prior to the particular time of day;
wherein the performing of the one or more power saving operations comprises:
directing the mobile device to abstain from attempting to connect to a mobile network;
maintaining data representative of a setting that specifies a time interval that the mobile device is to abstain from connecting to the network;
detecting an elapsing of the time interval;
directing, in response to the detecting of the elapsing of the time interval, the mobile device to attempt to connect to the mobile network and fetch data from a network server; and
directing, in response to a completion of the attempt to connect to the mobile network and fetch data from the network server, the mobile device to again abstain from attempting to connect to the mobile network.

13. The method of claim 12, wherein the performing of the one or more power saving operations further comprises:
detecting a signal level representative of an environmental condition external to the mobile device;
determining that the signal level is within a predetermined range; and
disabling, in response to the determining that the signal level is within the predetermined range, a feature of the mobile device.

14. The method of claim 12, further comprising:
maintaining, by the power management system, data representative of a usage profile associated with the mobile device and that indicates a pattern of usage of the mobile device;
wherein the identifying of the one or more power saving operations is based on the usage profile.

15. The method of claim 12, embodied as computer-executable instructions on at least one non-transitory computer-readable medium.

16. A system comprising:
at least one physical computing device that
detects a signal level representative of an environmental condition external to a mobile device;
determines that the signal level is within a predetermined range;
disables, in response to the determination that the signal level is within the predetermined range, a feature of the mobile device by directing, in response to the determination that the signal level within the predetermined range, the mobile device to abstain from attempting to connect to a mobile network;
maintains data representative of a setting that specifies a time interval that the mobile device is to abstain from attempting to connect to the mobile network;
detects an elapsing of the time interval;
directs, in response to the detection of the elapsing of the time interval, the mobile device to attempt to connect to the mobile network and fetch data from a network server while the signal level is within the predetermined range; and
directs, in response to a completion of the attempt to connect to the mobile network and fetch data from the network server, the mobile device to again abstain from attempting to connect to the mobile network.

17. The system of claim 16, wherein the signal level is an ambient noise level, and wherein the at least one physical computing device:
detects the signal level by utilizing a microphone that is a part of the mobile device to detect the ambient noise level;
determines that the signal level is within the predetermined range by determining that the ambient noise level is above a predetermined threshold; and
disables the feature of the mobile device by further disabling, in response to the determination that the ambient noise level is above the predetermined threshold, a sound feature of the mobile device.

18. The system of claim 17, wherein the at least one physical computing device further enables, in response to the determination that the ambient noise level is above the predetermined threshold, an auto-response mode of the mobile device in which the mobile device automatically transmits a message to a mobile telephone that places a telephone call to the mobile device while the ambient noise level is above the predetermined threshold, the message indicating that a user of the mobile device is unavailable to receive the telephone call.

19. The system of claim 16, wherein the signal level is a mobile network signal strength level representative of a strength of a mobile network at a location of the mobile device, and wherein the at least one physical computing device
determines that the signal level is within the predetermined range by determining that the mobile network signal strength level is below a predetermined threshold.

20. The system of claim 16, wherein:
the at least one physical computing device further receives user input representative of a request for the mobile device to have at least a user-specified amount of battery power remaining at a particular time of day; and the detection of the signal level is performed in response to the receipt of the user input.

* * * * *